United States Patent Office.

JOSEPH J. SLEEPER, OF CONCORD, AND HANSON A. JOHNS, OF MEDIA, PA.

COMPOSITION FOR CRAYONS.

SPECIFICATION forming part of Letters Patent No. 320,009, dated June 16, 1885.

Application filed September 29, 1884. (No specimens.)

*To all whom it may concern:*

Be it known that we, JOS. J. SLEEPER and HANSON A. JOHNS, citizens of the United States, residing, respectively, at Concord and Media, in the county of Delaware and State of Pennsylvania, have invented a new and useful composition of matter to be used in the manufacture of crayons or other articles for marking and delineating generally, of which the following is a specification.

Our composition consists of the following ingredients, combined in the proportions stated: water, eight pounds; kaolin, fifteen pounds; wheat-flour, one pound; soapstone, one pound; paris-white, forty-five pounds.

A thick paste is made of flour and water and dissolved in eight pounds of warm water. The other ingredients are thoroughly mixed therein by agitation. The water is pressed out of this composition and the same is squeezed through dies of suitable shape. The crayons harden by exposure to the air.

We do not confine ourselves to any precise proportions of the ingredients named, as they may be varied to make the articles of different degrees of hardness.

By the use of the above composition a crayon is made that does not require heat to harden, is free from dust, white in color, and by varying the proportions can be made of any degree of hardness, and which can be made in colors by coloring the water.

What we claim, and desire to secure by Letters Patent of the United States, is—

The herein-described composition of matter to be used in the manufacture of crayons and other articles for marking and delineating, consisting of water, kaolin, wheat-flour, soapstone, and paris-white, as specified.

JOS. J. SLEEPER.
HANSON A. JOHNS.

Witnesses:
CLAYTON P. HANAWAY,
D. P. BRUNER.